United States Patent
Theogaraj et al.

(10) Patent No.: US 10,425,870 B2
(45) Date of Patent: *Sep. 24, 2019

(54) WIRELESS CLIENT TRAFFIC CONTINUITY ACROSS CONTROLLER FAILOVER AND LOAD-BALANCING

(71) Applicant: Hewlett Packard Enterprise Development LP, Houston, TX (US)

(72) Inventors: Isaac Theogaraj, Bangalore (IN); Puneet Joshi, Bangalore (IN); Shishir Verma, Bangalore (IN); Sheausong Yang, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,803

(22) Filed: Oct. 27, 2017

(65) Prior Publication Data
US 2018/0049089 A1 Feb. 15, 2018

Related U.S. Application Data

(63) Continuation of application No. 14/699,879, filed on Apr. 29, 2015, now Pat. No. 9,826,449.

(51) Int. Cl.
*H04W 36/10* (2009.01)
*H04L 12/26* (2006.01)
(Continued)

(52) U.S. Cl.
CPC ......... *H04W 36/10* (2013.01); *G06F 11/2097* (2013.01); *G06F 21/00* (2013.01); *H04L 43/08* (2013.01); *H04L 47/00* (2013.01); *H04L 63/0428* (2013.01); *H04L 63/061* (2013.01); *H04L 65/4076* (2013.01); *H04L 67/142* (2013.01); *H04L 69/40* (2013.01); *H04W 52/00* (2013.01); *H04W 84/12* (2013.01); *H04W 88/12* (2013.01); *H04L 45/22* (2013.01);
(Continued)

(58) Field of Classification Search
CPC .............................. H04W 36/10; H04L 67/148
USPC .......................... 370/311–389; 455/522, 574
See application file for complete search history.

(56) References Cited

U.S. PATENT DOCUMENTS 7,167,912 B1 * 1/2007 Dhingra .............. H04L 43/0817
709/223
8,799,511 B1    8/2014 Balakrishna et al.
(Continued)

FOREIGN PATENT DOCUMENTS

EP    2521335 A2    11/2012

*Primary Examiner* — Iqbal Zaidi
(74) *Attorney, Agent, or Firm* — Hewlett Packard Enterprise Patent Department

(57) ABSTRACT

A non-transitory computer readable medium comprising instructions which, when executed by one or more hardware processors, causes performance of operations comprising: analyzing, by a first network coordination device, at least one session of the client device for selected characteristics, the first network coordination device being the primary network coordination device for the client device; and providing, by the first network coordination device, current session information of the at least one session of the client device having the selected characteristics to the second network coordination device, the second network coordination device being the standby network coordination device for the client device is shown.

17 Claims, 14 Drawing Sheets

(51) Int. Cl.

| | | |
|---|---|---|
| *H04L 12/70* | (2013.01) | |
| *G06F 21/00* | (2013.01) | |
| *H04L 29/06* | (2006.01) | |
| *H04W 84/12* | (2009.01) | |
| *H04W 88/12* | (2009.01) | |
| *H04L 12/707* | (2013.01) | |
| *H04L 12/803* | (2013.01) | |
| *H04W 52/00* | (2009.01) | |
| *H04L 29/14* | (2006.01) | |
| *H04L 29/08* | (2006.01) | |
| *G06F 11/20* | (2006.01) | |
| *H04W 36/24* | (2009.01) | |
| *H04W 8/30* | (2009.01) | |

(52) U.S. Cl.
CPC .......... *H04L 47/125* (2013.01); *H04L 63/101* (2013.01); *H04L 67/1034* (2013.01); *H04L 67/148* (2013.01); *H04W 8/30* (2013.01); *H04W 36/24* (2013.01)

(56) References Cited

U.S. PATENT DOCUMENTS

| | | |
|---|---|---|
| 9,537,761 B2 | 1/2017 | Limaye et al. |
| 2004/0100899 A1 | 5/2004 | Mahamuni |
| 2004/0199808 A1 | 10/2004 | Freimuth et al. |
| 2009/0049201 A1 | 2/2009 | Albert et al. |
| 2012/0144462 A1 | 6/2012 | Pochop, Jr. |
| 2014/0095925 A1 | 4/2014 | Wilson et al. |
| 2015/0378322 A1 | 12/2015 | Bruins et al. |

\* cited by examiner

| INDEX | PRIMARY CONTROLLER | ENCRYPTION KEY | TX COUNTER | RX COUNTER | PACKET TRANSMISSION RATE |
|---|---|---|---|---|---|
| 1 | CONTROLLER 1 | 12Ab7C13YZ | 9287710 | 26934 | 400 |
| 2 | CONTROLLER 3 | PQ67mn8916 | 7710218 | 1298 | 0 |
| 3 | CONTROLLER 3 | 3SDO0ZK421 | 534114 | 5790 | 250 |

FIG. 2

| INDEX | POINTER TO SESSION | ACTION(S) | STABLE | HIGH VALUE |
|---|---|---|---|---|
| 1 | MEMORY_ADDRESS_1 | ALLOW | ✓ | ✓ |
| 1 | MEMORY_ADDRESS_2 | ALLOW | ✓ | ✓ |
| 1 | MEMORY_ADDRESS_3 | LIMIT BANDWIDTH | ✓ | X |
| 2 | MEMORY_ADDRESS_4 | DENY | X | X |
| 2 | MEMORY_ADDRESS_5 | ALLOW | ✓ | X |
| 3 | MEMORY_ADDRESS_6 | DENY | X | X |
| 3 | MEMORY_ADDRESS_7 | ALLOW | ✓ | ✓ |

FIG. 9

| INDEX | PRIMARY CONTROLLER | 5-TUPLE VALUES | ACTION(S) |
|---|---|---|---|
| 1 | CONTROLLER 1 | (i) 10.20.22.92<br>(ii) 77.30.100.32<br>(iii) 10001<br>(iv) 20<br>(v) 1 | ALLOW |
| 1 | CONTROLLER 1 | (i) 10.22.78.84<br>(ii) 65.31.30.7<br>(iii) 35903<br>(iv) 4169<br>(v) 11 | ALLOW |
| 1 | CONTROLLER 1 | (i) 12.63.22.6<br>(ii) 77.30.100.32<br>(iii) 603<br>(iv) 9<br>(v) 1 | LIMIT BANDWIDTH |
| 5 | CONTROLLER 3 | (i) 4.102.75.1<br>(ii) 77.30.100.32<br>(iii) 9891<br>(iv) 20<br>(v) 17 | DENY |
| 5 | CONTROLLER 3 | (i) 160.14.98.30<br>(ii) 77.30.100.32<br>(iii) 30114<br>(iv) 79<br>(v) 28 | REDIRECT |

FIG. 10

WIRELESS CLIENT TRAFFIC CONTINUITY ACROSS CONTROLLER FAILOVER AND LOAD-BALANCING

FIELD

Embodiments of the disclosure relate to improving the performance of a wireless network. More specifically, embodiments of the disclosure relate to ensuring wireless traffic continuity when a controller handling a client's transmissions enters an inactive state.

BACKGROUND

In recent years, there has been a substantial increase in the use and deployment of wireless client devices, from dual-mode smartphones to laptop computers to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

In some embodiments, multiple controllers (e.g., network coordination devices) may jointly serve a common area. Accordingly, a client may obtain network connectivity by exchanging network traffic with one or more of the controllers via an access point. In a cluster controller environment wherein a plurality of controllers communicates amongst the cluster in order to share network information, including state information of the client devices connected to the network as well as the access points within the control scope of the cluster of controllers, a primary controller of a client device may handle the network traffic of the client device and a standby controller of the client device may handle the network traffic of the client device when the primary controller of the client device enters an inactive state, or as a result of load balancing. Similarly, a primary controller of an access point may handle the network traffic of the access point and a standby controller of the access point may handle the network traffic of the access point when the primary controller of the access point enters an inactive state, or as a result of load balancing.

Today, wireless communication networks often include a form of network security requiring a client device to present authentication information during an authentication process prior to obtaining access to the network. The authentication process may include establishing one or more encryption keys to encrypt and decrypt network traffic transmitted to and received from the client device. For example, a wireless communication network may implement a Wired Equivalent Privacy (WEP) security algorithm requiring the client device to present a proper encryption key.

When a client device connects to a communication network, an access point is the first network device with which the client device exchanges information. While the client device remains stationary, it remains associated with the same access point and does not expect a disturbance in its connectivity. However, when the primary controller of the client device fails, the encryption key established during the authentication process is lost. Therefore, a new encryption key must be established which typically requires deauthenticating the client device and re-authenticating the client device.

When a client device undergoes a de-authentication and re-authentication process, all current session information is lost including, for example, all secure shell (SSH) sessions, all file transfer protocol (FTP) sessions, all audio or video communications, etc. Additionally, some client devices include logic that, upon receiving a certain number of de-authentication notifications from an access point, the client device may attempt to associate with a different access point, which may not be beneficial to the wireless communication network and/or the client device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The disclosure may best be understood by referring to the following description and accompanying drawings that are used to illustrate embodiments of the disclosure.

FIG. 2 is a diagram illustrating an example of entries of a client standby state information table.

FIG. 9 is a diagram illustrating an example of entries of a main client session table 900.

FIG. 10 is a diagram illustrating an example of entries of a standby client session table 1000.

DETAILED DESCRIPTION

Figure 1:
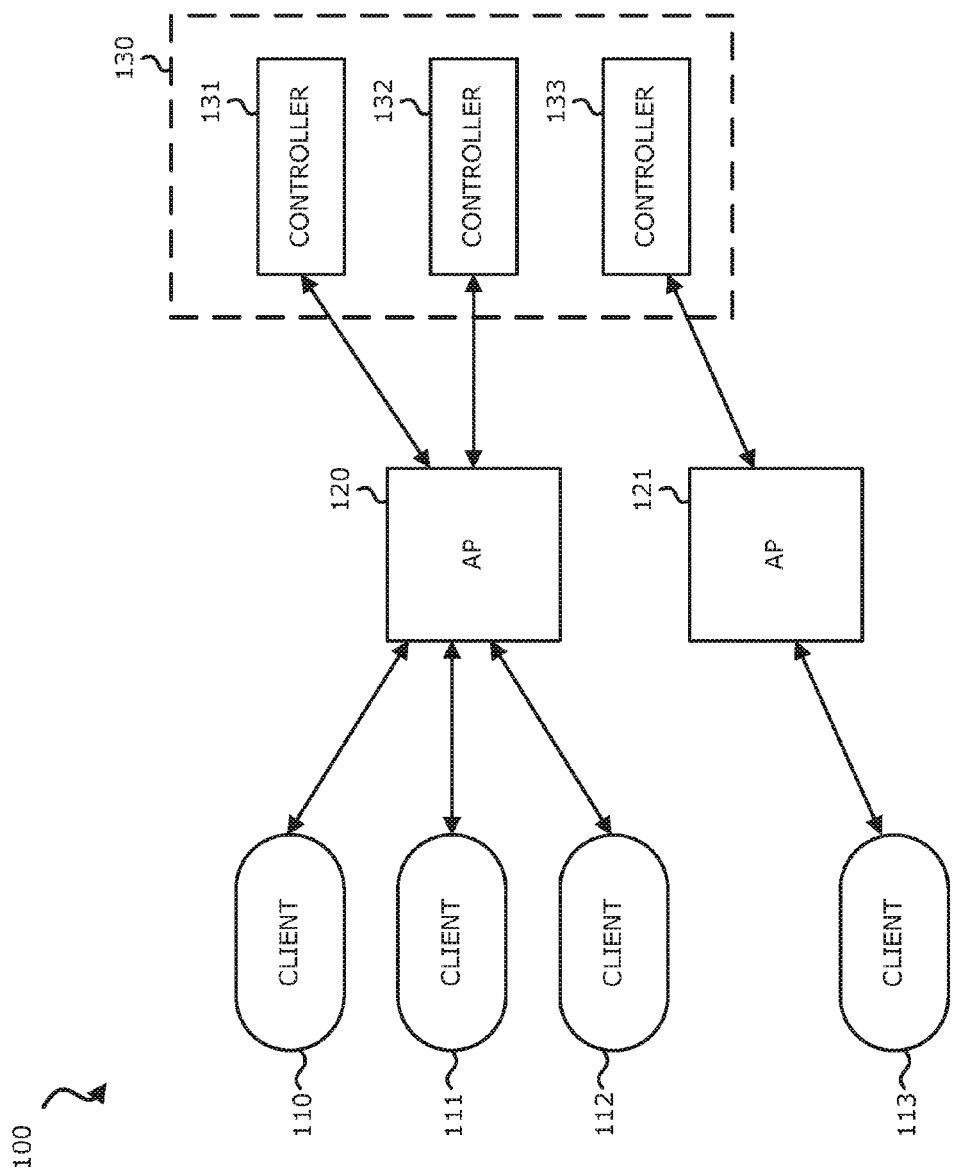
FIG. 1 is a block diagram of an exemplary communication network illustrating a flow of traffic between a plurality of client devices, access points, and network coordination devices.

Various embodiments of the disclosure relate to the maintenance of wireless network information associated with a client device connected to a wireless network and/or an access point within the control scope of a cluster of controllers of a wireless network. One embodiment of a wireless network may be comprised of one or more network coordination devices (e.g., controllers) forming a cluster of controllers, one or more access points within the control scope of the cluster of controller and one or more client devices seeking network connectivity via an access point and a controller.

Upon associating with an access point, a client device may undergo an authentication process with a controller. The controller may be assigned, by a managing controller of the cluster of controllers, to be the primary controller of the client device. Additionally, a second controller may be assigned by the managing controller to be a standby controller for the client device. Upon obtaining network connectivity, the client device may open one or more sessions through which the client device may obtain data from the network. For example, a user of a client device may open an Internet browser application with the client device thereby creating one or more HyperText Transfer Protocol (HTTP) sessions. Herein, by storing a copy of session information of particular sessions of the client device at the standby controller of the client device, the client device may maintain use of the particular sessions when the primary controller handling the network traffic of the client device enters an inactive state. When the primary controller handling the network traffic of the client device enters an inactive state, the standby controller may seamlessly transition to handling the network traffic of the client device by maintaining the session information of the particular sessions. Similarly, a copy of authentication information, e.g., one or more encryption keys, may be stored at the standby controller of the client device preventing the need for the client device to undergo a de-authentication process and a re-authentication process when the primary controller of the client device enters an inactive state.

In other embodiments of the disclosure, a controller of the cluster of controllers may be assigned as the primary controller of an AP within the control scope of the cluster of controllers, while a second controller is assigned to be the standby controller. The primary controller of the AP handles the one or more multicast subscriptions of client devices associated with the AP. For example, when a client device subscribes to a first multicast stream, the primary controller of the AP with which the client device is associated transmits the first multicast stream from the multicast router to the AP. The primary controller of the AP may stores multicast subscription information. Herein, a copy of multicast subscription information may be stored at the standby controller of the AP enabling the standby controller of the AP to seamlessly transition to transmitting the multicast subscriptions of the client devices associated with the AP without being required to poll each of the client devices to determine the necessary multicast streams to transmit.

I. Terminology

Herein, certain terminology is used to describe features within embodiments of the invention. For example, the term "network device" generally refers to electronic equipment that may be configured with an antenna system that enables transmission and/or receipt of wireless messages over a wireless network. Hence, the network device is further adapted with circuitry to support wireless connectivity with other network devices being part of the wireless network. Different types of network devices may include, but are not limited or restricted to (1) a client device and (2) an edge device.

Herein, the term "client device" may refer to a stationary network device (e.g., desktop computer, television, set-top box, video gaming console, etc.) or a mobile network device capable of connecting to one or more wireless networks. Illustrative examples of mobile network devices may include, among others, a tablet, laptop, netbook, barcode scanner, a digital camera and/or a mobile handset such as a smartphone or a personal digital assistant (PDA). Likewise, the term "access point (AP)" is a network device, a type of edge device in particular, that facilitates and/or controls access to a network. The AP may be deployed as either a wired access point that features wired connectivity with one or more client devices or a wireless access point that features wireless connectivity with one or more client devices. Of course, the AP also may represent other types of edge devices such as a wireless base station, a cellular base station or any device figured as a hot spot or gateway for network connectivity.

It is contemplated that a network device includes hardware logic such as one or more of the following: (i) processing circuitry; (ii) one or more communication interfaces such as a radio (e.g., component that handles the wireless data transmission and/or reception) and/or a physical connector to support wired connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules that may be stored in any type of a suitable non-transitory storage medium (described above) or transitory computer-readable transmission media (e.g., electrical, optical, acoustical or other form of propagated signals such as carrier waves, infrared signals, digital signals), The term "link" is a physical or logical communication path between two or more network devices. Examples of a link may include a wireless link that supports the transfer of wireless messages over certain radio frequency (RF) channels and/or bands or cellular frequency channels and/or bands, as well as the logic associated therewith.

The term "message" generally refers to information transmitted as information in a prescribed format, where each message may be in the form of a packet, a frame, an IEEE 802.11 frame, or any other series of bits having the prescribed format.

The term "state information" should be interpreted to include one or more of, at least, authentication information, firewall session information, unicast transmission information (e.g., counters for packets transmitted and received, packet transmission rate, etc.), multicast information, gateway information, and/or optimization information for a particular client device.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Communication Network Including a Cluster of Controllers

Referring to FIG. 1, a block diagram of an exemplary communication network 100 illustrating a flow of traffic between a plurality of client devices, access points, and network coordination devices is shown. The controllers 131, 132 and 133 comprise a cluster of controllers 130 within the communication network 100. The controller 131 serves as the primary controller for the AP 120 and the client device 110. The controller 132 serves as the primary controller for the client devices 111 and 112. The controller 133 serves as the primary controller for the AP 121 and the client device 113. As the primary controller for the client device 110, the controller 131 stores the state information and manages the network traffic of the client device 110. Similarly, the controller 132, as primary controller of both the client devices 111 and 112, stores the state information and manages the network traffic of the client devices 111 and 112. Finally, as the primary controller of the client device 113, the controller 133 stores the state information and manages the network traffic of the client device 113. According to the diagram of FIG. 1, both the APs 120 and 121 are within the control scope of the cluster of controllers 130.

With today's ubiquity of mobile client devices, it is common for client devices to roam throughout a wireless communication network with the assumption that they will not lose their connectivity to the wireless network. For example, the client device 110 may roam throughout the communication network 100 wherein the roaming results in a disassociation of the client device 110 from the AP 120 and association of the client device 110 with the AP 121. However, in a cluster controller environment, as is seen in FIG. 1, the controller 131 will remain the primary controller of the client device 110 as the client device 110 roams within the control scope of the cluster of controllers 130. This prevents the need to recreate any state information by a controller within the cluster when a client device roams. Details regarding the implementation of the cluster of controllers 130 are disclosed in U.S. patent application Ser. No. 14/504,830, which was filed on Oct. 2, 2014, the contents of which are incorporated herein by reference.

Additionally, within the cluster of controllers 130, a second controller may be assigned as a standby controller for each client device. The standby controller for the client device communicates with the primary controller of the client device in order to store a backup copy of the state information of the client device and handle packet transmissions of the client device upon the primary controller entering an inactive state (e.g., taken offline, placed in a suspended state, placed in a disabled state, etc.). For example, the controller 132 may be assigned as the standby controller for the client device 110 such that the controller 132 stores a backup copy of the state information of the client. In particular, the state information stored by the standby controller for a client device may include a transmit counter and a receive counter. The transmit counter represents the number of packets transmitted by the primary controller to the client device while the receive counter represents the number of packets successfully received by the primary controller from the client device. The standby controller may store the state information of each client device for which the standby controller is assigned in a database. The transmit counter will monotonically increase for each transmitted packet while the receive counter will monotonically increase for each received packet. In one embodiment, the transmit counter and receive counter will be monotonically incremented at a one-to-one ratio for each packet transmitted and received, respectively. However, the increment does not have to be done at a one-to-one ratio but may be any ratio wherein the counter is monotonically incremented. It has also been contemplated that the transmit nd receive counters may be implemented in a decrementing manner.

III. Unicast Client Traffic Continuity

Referring to FIG. 2, a diagram illustrating an example of entries of a client standby state information table 200 is shown. The column 201 represents an index value that uniquely identifies the client device to which the state information of the corresponding row belongs. In one embodiment, the index value may be computed from a hash value computed from the MAC address of the client device. Referring to row 210 for explanatory purposes, the column 202 represents the primary controller of the client device corresponding to the index value '1'. The column 203 represents an encryption key used by the primary controller to encrypt one or more packets prior to transmitting the one or more packets to the client device corresponding to the index value '1'. In the embodiment illustrated in FIG. 2, the encryption key used by the primary controller of the client device corresponding to the index value '1' to encrypt one or more packets prior to transmitting to the client device corresponding to the index value '1' is the same as the encryption key used to decrypt one or more packets transmitted by the client device corresponding to the index value '1'. However, in a second embodiment not illustrated, the client standby state information table 200 may store a first encryption key used by the primary controller of the client device corresponding to the index value '1' to encrypt one or more packets prior to transmitting to the client device corresponding to index value '1' and a second encryption key used by the primary controller of the client device corresponding to index value '1' to decrypt one or more packets transmitted by the client device corresponding to the index value '1'. Herein, the standby state information table 200 may be stored in a non-transitory computer-readable storage medium on the standby controller.

The column 204 represents the transmit counter corresponding to the number of packets that have been transmitted by the primary controller of the client device corresponding to the index value '1' to the client device corresponding to the index value '1'. The column 205 represents the receive counter corresponding to the number of packets that have been transmitted by the client device corresponding to the index value '1'. The standby controller may also optionally store the packet transmission rate of packets being transmitted to the client device (the column 206). As will be discussed in detail below, the packet transmission rate may enable the standby controller to dynamically compute an offset value that is to be added to the transmit counter included in the first transmission to the client device when the standby controller assumes responsibility for handling the network traffic of the client device. Of course, the client standby state information table 200 is not limited to three index entries but may, in one embodiment, include hundreds of entries, and in a second embodiment, include thousands of entries.

Figure 3A:
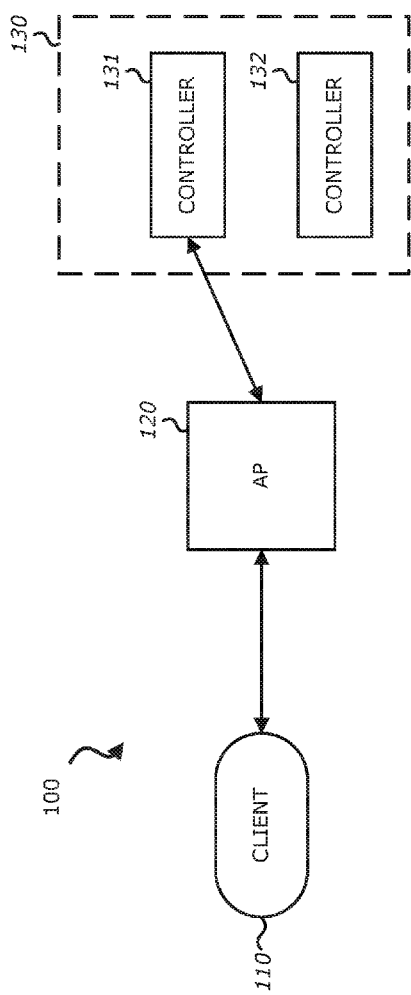
FIG. 3A is an exemplary diagram of a portion of the communication network 100 of FIG. 1.
Figure 3B:
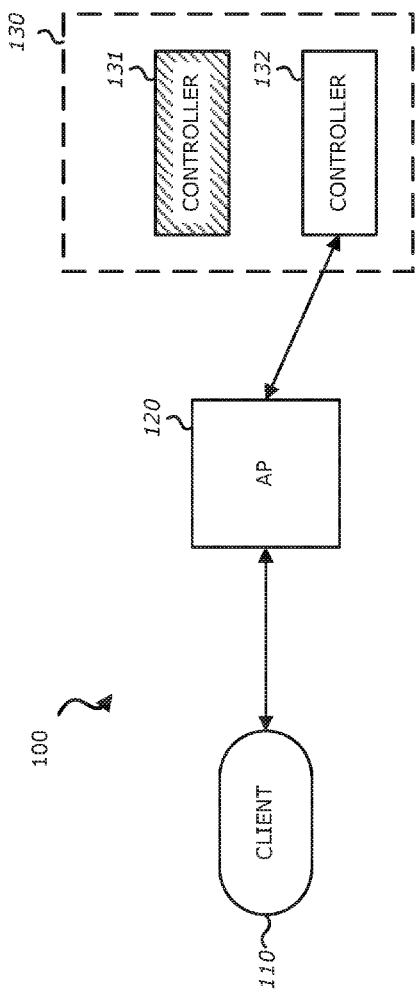
FIG. 3B is a second exemplary diagram of the portion of the communication network 100 as illustrated in FIG. 3A.

Referring to FIG. 3A, an exemplary diagram of a portion of the communication network 100 of FIG. 1 is shown. According to FIG. 3A, the client device 110 is associated with the AP 120 and is assigned to the controller 131. Additionally, the controller 132 is assigned to be the standby controller for the client device 110. Now referring to FIG. 3B, a second exemplary diagram of the portion of the communication network 100 as of FIG. 3A is shown. FIG. 3B illustrates the standby controller (the controller 132) assuming responsibility of handling the network traffic of the client device 110 when the primary controller (the controller 131) enters an inactive state. As is shown in FIG. 3B, the client device 110 is still associated with AP 120. Typically, the client device 110 has no knowledge or awareness of the state of any of the controllers of the cluster of controllers 130. Therefore, as the client device 110 remains associated with the AP 120, it can be assumed that the client device 110 does not expect to be required to undergo a de-authentication process and a re-authentication process with the communication network 100 when the controller 131 enters an inactive state. Embodiments of this disclosure describe the handling of the state information of the client device 100 by the controllers of the cluster of controllers 130, specifically the standby controller of the client device 110, to avoid requiring the client device 110 to undergo a de-authentication process and a re-authentication process with the communication network 100.

Figure 4:
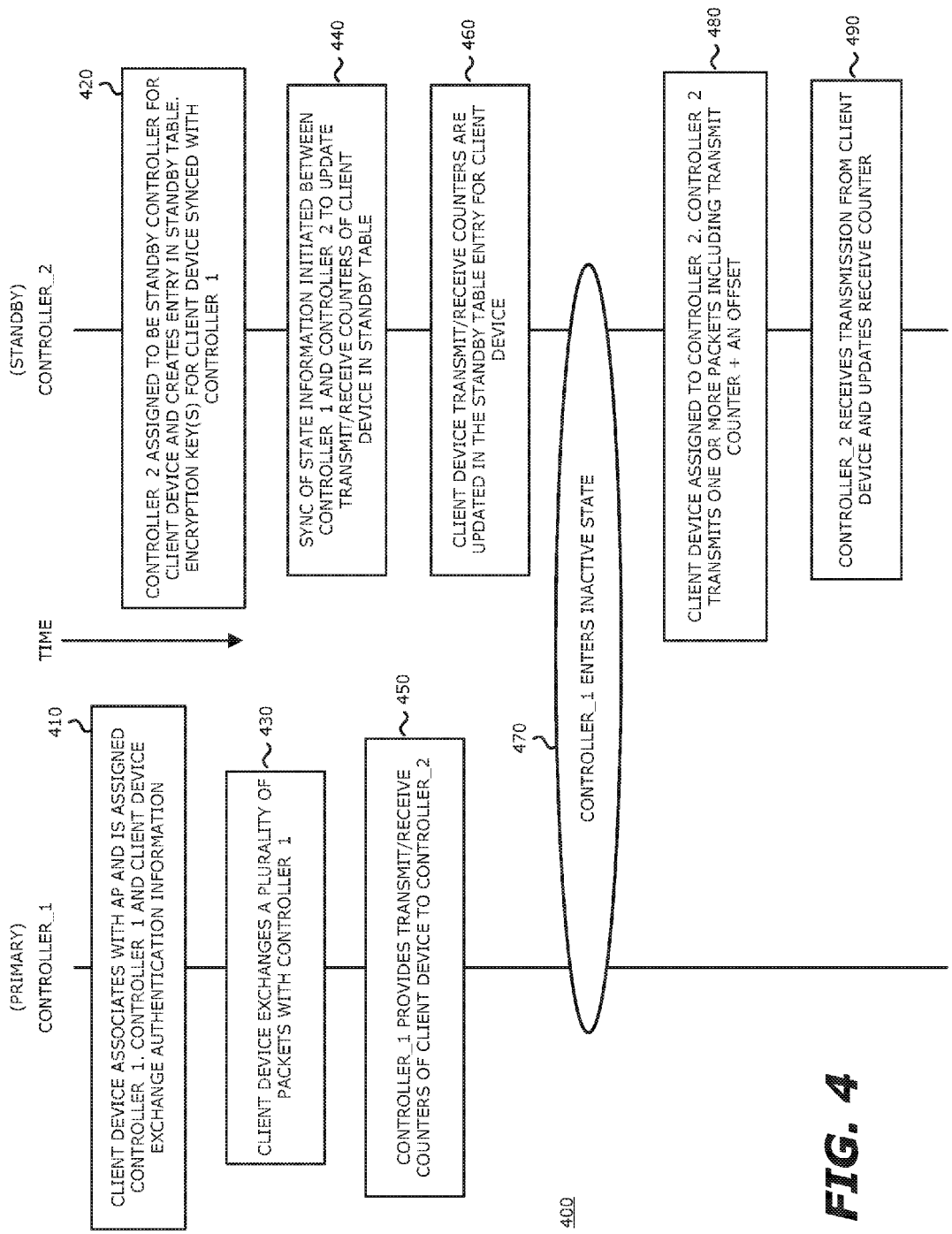
FIG. 4 is an exemplary block diagram illustrating a timeline 400 of actions involving a primary controller and a standby controller pertaining to the handling of a client device.

Referring to FIG. 4, an exemplary block diagram illustrating a timeline 400 of actions involving a primary controller and a standby controller pertaining to the handling of a client device is shown. The left column illustrates actions involving the primary controller and the right column illustrates actions involving the standby controller. In the embodiment illustrated in FIG. 4, the actions are shown to progress in a time-ordered, top-to-bottom manner. However, in other embodiments, the order of one or more actions may differ. At block 410, controller_1, included within a cluster of controllers, is assigned to be the primary controller for a client device that associates with an AP within the control scope of the cluster of controllers. Typically, the client device is required to undergo an authentication process in order to obtain connectivity to the network. Herein, upon associating with the AP in an attempt to obtain network connectivity, controller_1 and the client device exchanging authentication information. Controller_1 stores the encryption information that will be used to encrypt and decrypt packets transmitted to and received from the client device.

At block 420, controller_2 is assigned to be the standby controller for the client device. Upon being assigned as the standby controller for the client device, controller_2 creates an entry for the client device within its client standby state information table. Controller_2 subsequently synchronizes one or more portions of the state information of the client device with controller_1. As used throughout the specification, the term "synchronization," or any tense thereof, should be understood as updating one or more values of a second set of data, e.g., in the form of a table or database, based on one or more values of a first set of data. For example, one or more values in a second set of data may be replaced with one or more values of a first set of data (e.g., the first set of data may represent more recently obtained data than the second set). In particular, controller_2 synchronizes the encryption information for the client device. For example, the encryption information may contain an encryption key used by the primary controller to encrypt packets transmitted to the client device and decrypt packets received from the client device, as is shown in FIG. 2. Alternatively, the encryption key used to encrypt packets transmitted to the client device may not be the same as the encryption key used to decrypt packets received from the client device, as discussed above. In such a situation, the standby controller would synchronize both, a first encryption key used encrypt packets transmitted to the client device and a second encryption key used to decrypt packets received from the client device.

At block 430, the client device exchanges a plurality of packets with controller_1. For example, the user of the client device may open an Internet browsing application and request a particular website, hence opening up one or more HyperText Transfer Protocol (HTTP) sessions. Controller_1 transmits the necessary packets to load the requested website on the client device. The exchange of the request for the website and the packets to load the website results in an increase in the transmit and receive counters for the client device stored on controller_1.

At block 440, a synchronization of the state information of the client device is initiated between controller_1 and controller_2. The initiation of a synchronization between controller_1 and controller_2 may be a result of a push method of controller_1 and/or a pull method of controller_2. In one embodiment in which a push method of controller_1 is used, controller_1 may push current state information of the client device to controller_2 such that controller_2 may update the entry in its standby table (e.g., the client standby state information table) corresponding to the client device. The push of current state information (e.g., transmission of one or more packets containing the current state information of the client device) by controller_1 may occur at predefined time intervals (e.g., every 30 seconds) and/or after a predetermined number of packets have been transmitted by controller_1. For example, a push of current state information may occur every 30 seconds and also occur after transmission of 1,500 packets by controller_1 to the client device. A pull of current state information (e.g., transmission of a request for one or more packets containing the current state information of the client device) may occur at predefined time intervals. In one embodiment, both methods may be used.

At block 450, controller_1 provides controller_2 with one or more portions of the current state information of the client device (e.g., the encryption information does not need to be synchronized more than once). In one embodiment, controller_1 may only provide the transmit and receive counters of the client device. In a second embodiment, controller_1 may provide the transmit and receive counters as well as the packet transmit rate. Other state information may be provided in other embodiments. At block 460, when controller_2 receives the one or more portions of the current state information from controller_1, controller_2 updates the entry in the standby table corresponding to the client device.

In one embodiment, a synchronization-retry mechanism may be implemented. In one example, when a pull mechanism is used and the standby controller does not receive any state information to synchronize from the primary controller within a predetermined time period, the standby controller may retry the synchronization request. Alternatively, if a push mechanism is implemented and the primary controller requests a confirmation the standby controller received the state information to synchronize but does not receive the confirmation within a predetermined time period after transmitting the state information, the primary controller may retry transmitting the state information.

At block 470, controller_1 enters an inactive state. At block 480, the client device is assigned to controller_2. The transition from controller_1 handling the network traffic of the client device to controller_2 handling the network traffic of the client device occurs while the encryption key(s) used to encrypt and decrypt packets transmitted to and received from the client device remain the same. Therefore, there is no need to require the client device undergo a de-authentication process and a re-authentication process because controller_2 has the encryption key(s) stored in the entry of the standby table corresponding to the client device.

Previously, when a controller handling the network traffic of a client device (primary controller) entered an inactive state, the client device was required to be deauthenticated and re-authenticated as the encryption information of the client device was lost when the controller entered an inactive state. Herein, by storing the encryption information of the client device at a standby controller, the standby controller can handle the network traffic of the client device in the same manner as the primary controller (e.g., encrypt and decrypt network traffic of the client device using the same encryption key(s)) so there is no need to de-authenticate and re-authenticate the client device.

Still referring to block 480, controller_2 transmits one or more packets that include the transmit counter stored in an entry for the client device in the client standby state information table of controller_2 plus an offset. The transmit counter stored in the client standby state information table of controller_2 is incremented by the offset in order to account for one or more packets that may have been transmitted by controller_1 to the client device following the last synchronization of state information between controller_1 and controller_2. Accounting for the possibility that controller_1 transmitted one or more packets to the client device following the last synchronization with controller_2 is critical in ensuring a seamless transition of controller_2 handling the network traffic of the client device. As discussed above, the client device maintains a receive counter which corresponds to the last transmit counter received in a transmission from the primary controller of the client device. The client device will reject any received packets that include a transmit counter having a lower value than the receive counter stored by the client device. The client device behaves this way to aid in protecting against security attacks, in particular replay attacks.

The offset may be a predefined numerical value or may be dynamically computed by the logic of controller_2. For example, in one embodiment, a predefined offset may correspond to a predetermined threshold (number of packets) that, when met and/or exceeded, triggers a synchronization of state information between the primary controller and the standby controller of the client device (e.g., the offset may be twice the value of the predetermined threshold that triggers the synchronization of state information).

At block 490, controller_2 receives a transmission from the client device that includes a transmit counter. Controller_2 subsequently updates the receive counter stored in the client standby state information table of controller. The state information of the client device stored on controller_2 is now updated such that the transmit counter of controller_2 matches the receive counter of the client device and the receive counter of controller_2 matches the transmit counter of the client device. As discussed above, by updating the state information of the client device at controller_2 (e.g., the former standby controller) upon controller_1 entering an inactive state, the transmissions exchanged between the client device and controller_2 should be protected from replay attacks.

In one exemplary embodiment, the one or more packets transmitted by controller_2 upon assuming responsibility for handling the network traffic of the client device may comprise an Address Resolution Protocol (ARP) request. The ARP request will include the transmit counter incremented by the offset allowing the client device to update its receive counter. The use of an ARP request is advantageous as it results in an ARP response by the client device. Importantly, an ARP response will include the transmit counter of the client device enabling controller_2 to update its receive counter for the client device. When this exchange is complete, the transmit and receive counters have been updated at both the client device and controller_2 therefore protecting against replay attacks.

Figure 5A:
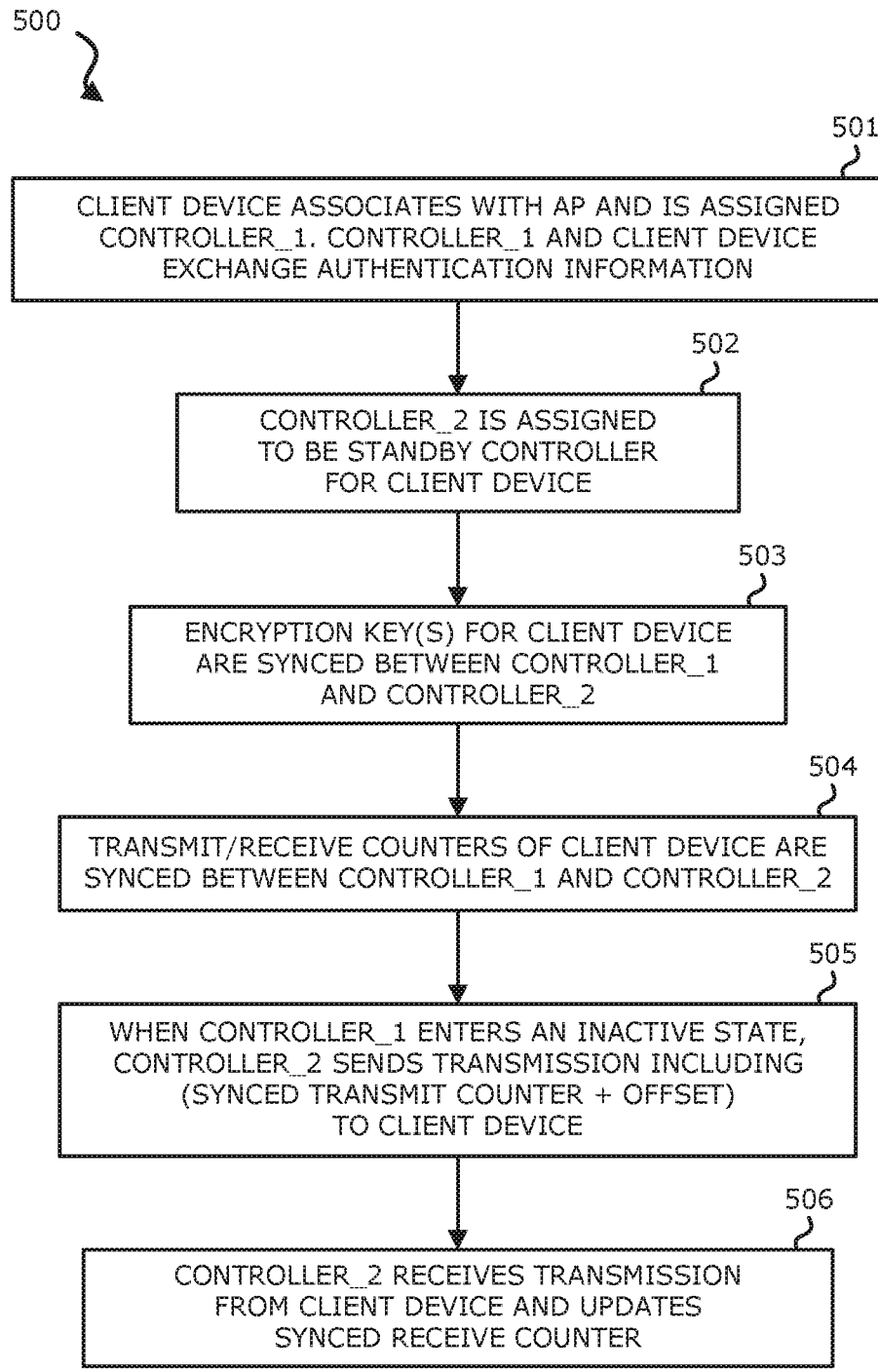
FIG. 5A is a flowchart of an example process of actions involving a primary controller and a standby controller regarding the handling of a client device.

Referring to FIG. 5A, a flowchart of an example process of actions involving a primary controller and a standby controller regarding the handling of a client device is shown. Each block illustrated in FIG. 5A represents an operation performed in the method 500 of the synchronization of one or more portions of state information, particularly encryption information and transmit and receive counters between a primary controller for a client device and a standby controller for the client device. At block 501, a client device associates with an AP within the control scope of a cluster of controllers, the client device is assigned to controller_1 (the primary controller) being within the cluster of controllers and the client device obtains network connectivity by providing controller_1 with authentication information (e.g., using an encryption key).

At block 502, controller_2 is assigned to be the standby controller for the client device. As a result, controller_2 creates an entry for the client device in controller_2's standby state information table. At block 503, the encryption key(s) used by controller_1 to encrypt network traffic transmitted to and decrypt network traffic received from the client device are synchronized between controller_1 and controller_2. As discussed above, an initiation of the synchronizing process may be either by controller_1 using a push method and/or by controller_2 using a pull method. Furthermore, the initiation of the synchronizing processing may be performed according to predetermined time intervals and/or a predefined threshold of transmitted packets from controller_1 to the client device (or vice versa).

At block 504, one or more portions of the state information, particularly, the transmit counter and the receive counter corresponding to network traffic transmissions between the client device and controller_1 are synchronized between controller_1 and controller_2. Optionally, as discussed above, the one or more portions of the state information synchronized between controller_1 and controller_2 may include, inter alia, the packet transmission rate of the packets transmitted from controller_1 to the client device. The packet transmission rate may be determined by controller_1 based on the number of packets sent over a predefined time interval (e.g., the number of packets sent over a 30 second time interval). Controller_1 may subtract the value of the transmit counter at the beginning of the 30 second interval from the value of the transmit counter at the end of the 30 second interval to determine the number of packets transmitted during the particular 30 second interval. In one embodiment, controller_2 may only update the packet transmission rate if the current packet transmission rate is greater than the currently stored packet transmission (e.g., in order to avoid updating the packet transmission rate for the client device calculated during a moment of inactivity by the client device).

At block 505, when controller_1 enters an inactive state, controller_2 assumes responsibility for handling the network traffic of the client device and transmits one or more packets that include the transmit counter stored in an entry for the client device in the client standby state information table of controller_2 plus an offset. The transmit counter stored in the client standby state information table of controller_2 is incremented by the offset in order to account for one or more packets that may been transmitted by controller_1 to the client device following the last synchronization of state information between controller_1 and controller_2.

At block 506, when controller_2 receives a transmission from the client device and updates the value of the receive counter that was stored in the entry for the client device in the standby table.

Figure 5B:
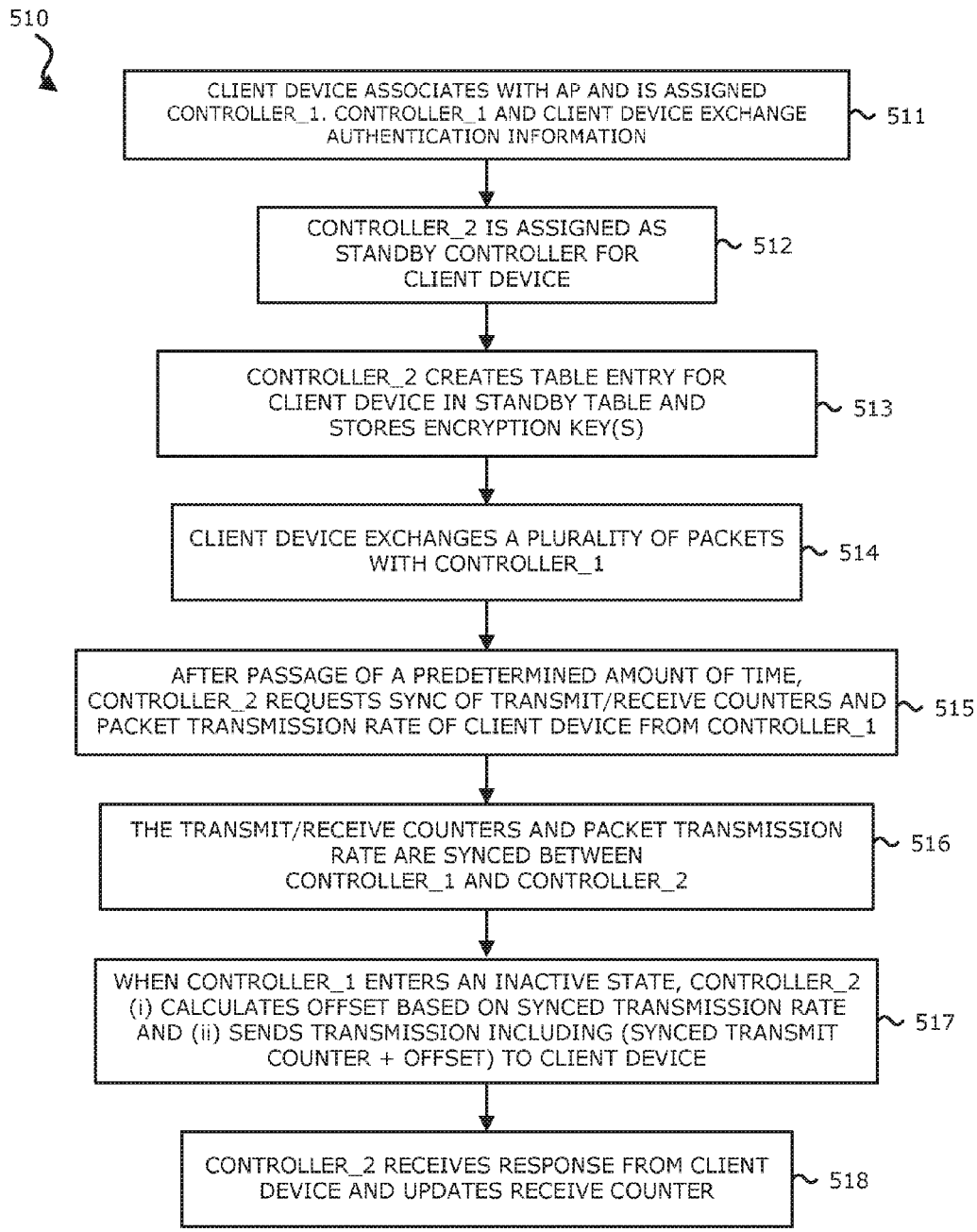
FIG. 5B is a second flowchart of an example process of actions involving a primary controller and a standby controller regarding the handling of a client device.

Referring to FIG. 5B, a second flowchart of an example process of actions involving a primary controller and a standby controller regarding the handling of a client device is shown. Each block illustrated in FIG. 5B represents an operation performed in the method 510 of synchronizing one or more portions of state information, particularly encryption information and transmit and receive counters between a primary controller for a client device and a standby controller for the client device. At block 511, a client device associates with an AP within the control scope of a cluster of controllers, the client device is assigned to controller_1 (the primary controller) being within the cluster of controllers and the client device obtains network connectivity by providing controller_1 with authentication information (e.g., using an encryption key). At block 512, controller_2 is assigned to be the standby controller for the client device. As a result, controller_2 creates an entry for the client device in controller_2's standby state information table. At block 513, the encryption key(s) used by controller_1 to encrypt network traffic transmitted to and decrypt network traffic received from the client device are synchronized between controller_1 and controller_2.

At block 514, the client device exchanges a plurality of packets with controller_1. As discussed above, one embodiment of an exchange of a plurality of packets may include a request by the client device to load a webpage through an Internet browsing application and the transmission of packets comprising the webpage from controller_1. At block 515, after the passage of a predetermined time period, controller_2 requests a synchronization of the transmit and receive counters and the packet transmission rate of the client device.

At block 516, one or more portions of the state information, particularly, (i) the transmit counter and the receive counter corresponding to network traffic transmissions between the client device and controller_1 and (ii) the packet transmission rate of the packets transmitted from controller_1 to the client device are synchronized between controller_1 and controller_2 (e.g., controller_2 updates the entry corresponding to the client device in the client standby state information table).

At block 517, when controller_1 enters an inactive state, controller_2 calculates an offset to be added to the transmit counter stored in the entry in the client standby state information table corresponding to the client device. In the embodiment illustrated in FIG. 5B, the offset is calculated based on the packet transmission rate stored in the entry in the client standby state information table corresponding to the client device. The offset may be, for example, twice the value of the number of packets transmitted according to the packet transmission rate (e.g., a packet transmission rate of 1,500/30 second interval may result in an offset of 3,000 packets). Upon calculating the offset, controller_2 transmits one or more packets to the client device that include the synchronized transmit counter incremented by the offset.

At block 518, controller_2 receives a transmission from the client device, e.g., which may be in response to the transmission by controller_2 to the client device. Subsequently, controller_2 updates the receive counter corresponding to the client device based on the transmit counter included in the transmission from the client device.

IV. Multicast Client Traffic Continuity

Figure 6A:
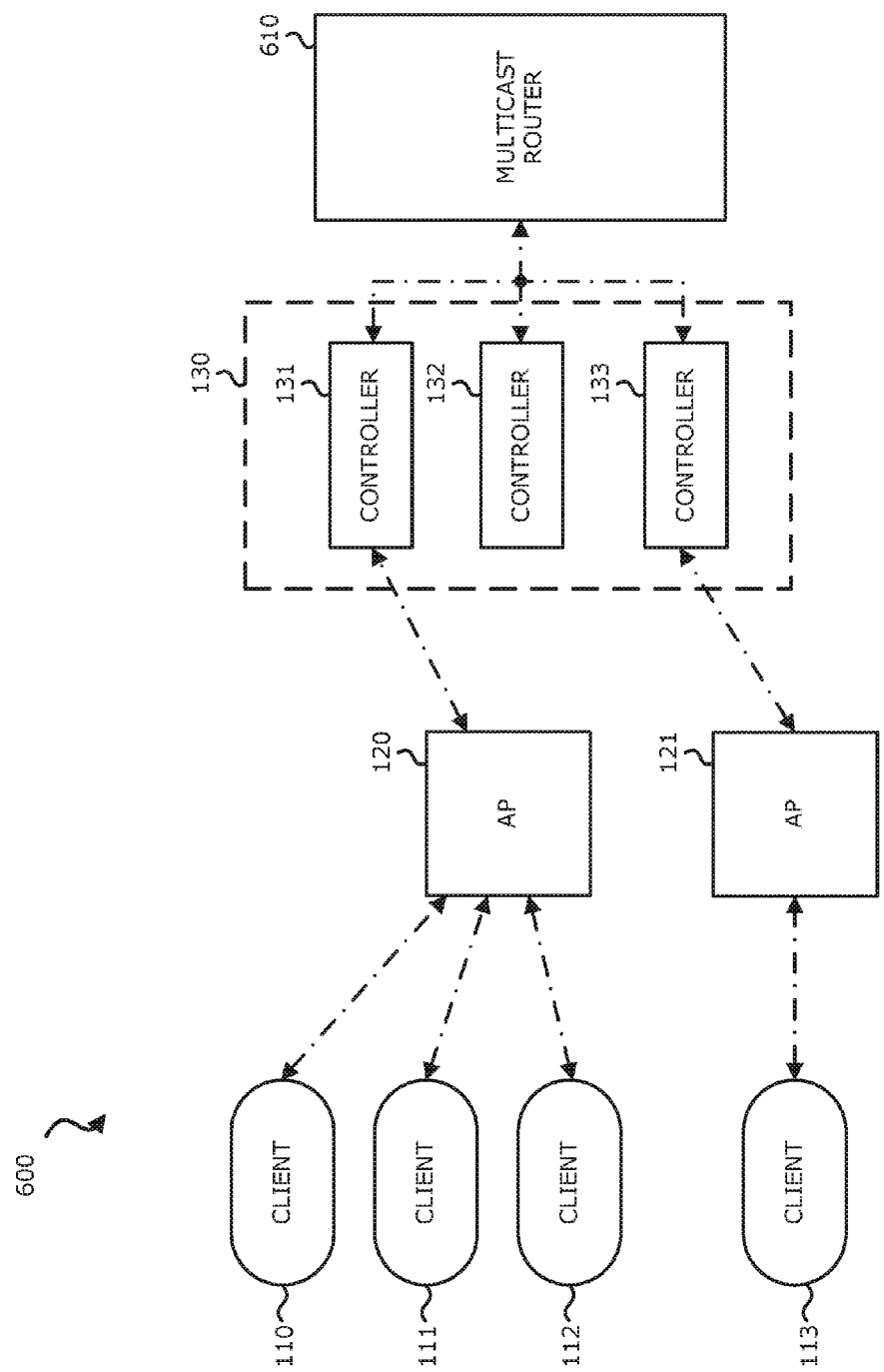
FIG. 6A is a diagram of the exemplary communication network 600 illustrating multicast transmission paths.

Referring to FIG. 6A, a diagram of the exemplary communication network 600 illustrating multicast transmission paths (e.g., a data stream path) is provided. As shown in FIG. 6A, the client devices 110-112 are associated with the AP 120, the client device 113 is associated with the AP 121, the controller 131 is assigned as the primary controller of the AP 120 and the controller 133 is assigned as the primary controller of the AP 121. The AP 120 is transmitting the multicast streams to the client devices 110-112 (illustrated by dashed-and-dotted lines). For efficiency, and utilizing communication features of the cluster of controllers 130, the controller 131 transmits the multicast streams subscribed to by the client devices 110-112 even if the controller 131 is not the primary controller of one or more of the client devices 110-112. The handling of multicast streams within a communication network including a cluster of controllers is described in U.S. patent application Ser. No. 14/504,830.

Additionally, the controller 132 may be the standby controller for the AP 120. As the standby controller for the AP 120, the controller 132 maintains a copy of the state information of the AP 120 also maintained by the controller 131. For example, as discussed above, state information may include authentication information, firewall session information, unicast transmission information (e.g., counters for packets transmitted and received, packet transmission rate, etc.), multicast information, gateway information, and/or optimization information for a particular client device. Regarding the multicast proxy, it is particularly important that the standby controller (e.g., the controller 132) maintains the multicast information which may include, but is not limited or restricted to, a transmit counter for each multicast stream to which at least one client device associated with the AP 120 is subscribed, which client devices are associated with the AP 120, the multicast streams to which each of the associated client devices are subscribed, and/or the current state of transmission for each of the multicast streams (e.g., unicast or multicast as discussed in U.S. patent application Ser. No. 14/504,830).

In particular, as the standby of the AP 120, the controller 132 maintains the multicast transmit counter for each multicast stream to which at least one of the client devices 110-112 are subscribed. As discussed above regarding the synchronizing of the transmit and receive counters for unicast transmission corresponding to a single client device, including the multicast transmit counter for each the multicast stream with the transmission of the multicast stream prevents against replay attacks. In addition, as discussed above, as will be discussed below, when the controller 132 assumes responsibility of handling the transmission of the multicast streams to the AP 120, the first transmission by the controller 132 includes the synchronized multicast transmit counter that has been incremented by an offset. The multicast transmit counter for each multicast stream is incremented by an offset to account for possible packets transmitted by the controller 131 to the AP 120 following the last synchronization between the controller 131 and the controller 132. Each of the client devices 110-113 maintain a receive counter for each multicast stream to which it subscribes. When a client device, e.g., the client device 110, receives one or more packets of a multicast stream having a lower value than the value of the transmit counter of the particular multicast stream stored by the client device 110, the client device 110 rejects the one or more packets. By rejecting packets having a lower value than the value of the transmit counter of the particular multicast stream stored by the client device 110, the client device 110 aids in protecting against replay attacks.

The controller 132 maintains a copy of the state information of the AP 120 maintained by the controller 131 by synchronizing its copy of the state information at various times or based on certain occurrences, as discussed above regarding synchronizing of state information of client devices between a primary controller and standby controller of the client device. Examples of points at which the controller 132 may synchronize its copy of the state information maintained by the controller 131 include, but are not limited or restricted to, at the expiration of predetermined time intervals, when a client device subscribes to a new multicast stream (e.g., based on a notification from the controller 131), when a client device unsubscribes from a multicast stream, when a client device moves from a first AP to a second AP, immediately following an instruction for the controller 131 (e.g., the primary controller) to be taken offline and/or immediately following a load balancing instruction. The state information may be maintained by the controller 132 in a table format, including, among others, a hash table or a linked list.

Figure 6B:
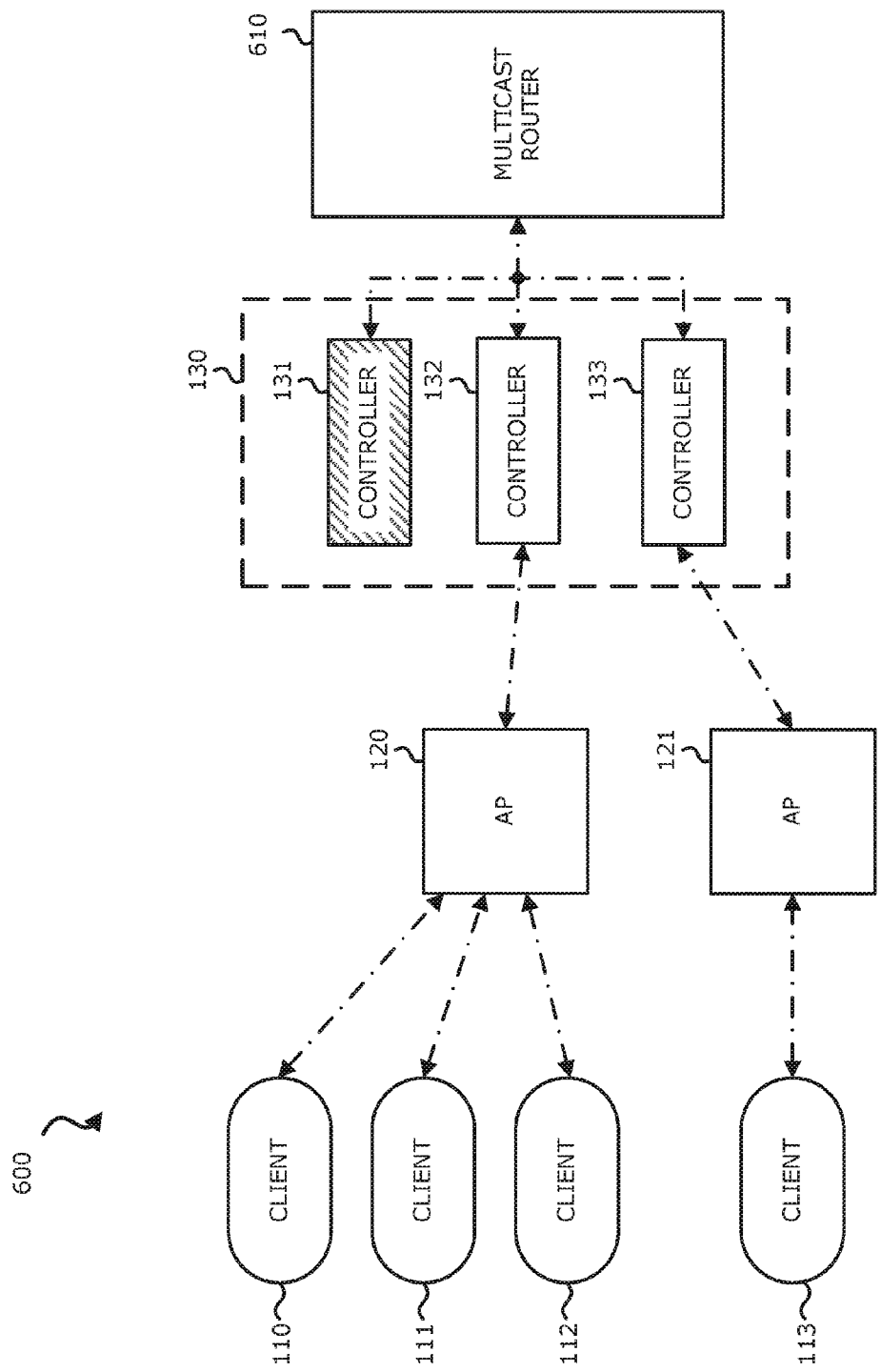
FIG. 6B is a diagram of the exemplary communication network 600 of FIG. 6A illustrating the multicast transmission paths wherein the controller 131 is in an inactive state.

Referring to FIG. 6B, a diagram of the exemplary communication network 600 of FIG. 6A illustrating the multicast transmission paths (e.g., a data stream path) wherein the controller 131 is in an inactive state is shown. More specifically, FIG. 6B illustrates the multicast transmission paths in the exemplary communication network 600 of FIG. 6A when the controller 131 is in an inactive state and the controller 132 (e.g., previously the standby controller to the controller 131 for the AP 120) has seamlessly taken over transmitting the multicast streams to the AP 120 for the controller 131. In the embodiment illustrated in FIG. 6B, the one or more multicast streams to which the client devices 110-112 have subscribed are each being transmitted to the client devices 110-112 from the controller 132 through the AP 120. In addition, the controller 131 is inactive as illustrated by the shading present in the box representing the controller 131. Furthermore, the controller 131 is no longer receiving any multicast streams from the multicast router 610.

In one embodiment, upon synchronizing the state information of the AP 120 with the controller 131, the controller 132 subscribes to any multicast stream subscribed to by one or more of the client devices 110-112. Therefore, when the controller 131 enters into an inactive state, the controller 132, as the standby controller for the AP 120, can seamlessly transition to handling the multicast streams of the client devices 110-112 as the controller 132 is already subscribed to the necessary multicast streams.

As discussed above, the controller 131 may have entered an inactive state for one of a plurality of reasons including, but not limited or restricted to, (i) failure of the controller 131 or (ii) the controller 131 being purposefully taken offline by, for example, a network administer so software upgrades may be performed on the controller 131. In an alternative embodiment, the controller 132 may take over for the controller 131 as primary controller of the AP 120 if, for example, a managing controller of the cluster of controllers issues a load balancing command that requires the controller 132 to begin multicast transmission to the AP 120 and allow the controller 131 to take on other responsibilities within the cluster of controllers 130. The cluster of controllers 130 may determine that a controller, such as, the controller 131, for example, has gone offline by the lack of a reception of a heartbeat from the controller 131. Alternatively, the network administer may propagate a notification to the controllers within the cluster of controllers regarding the controller 131 being inactive. Herein, the managing controller of the cluster of controllers 130 may issue the assignments for primary controllers and standby controllers.

In at least one embodiment, upon detecting that the controller 131 has entered into an inactive state, the controller 132, as the standby controller for the AP 120, may notify the other controllers within the cluster of controllers 130 that the controller 131 is in an inactive state and/or that it has assumed the multicast stream transmission responsibilities of the controller 131.

Figure 7:
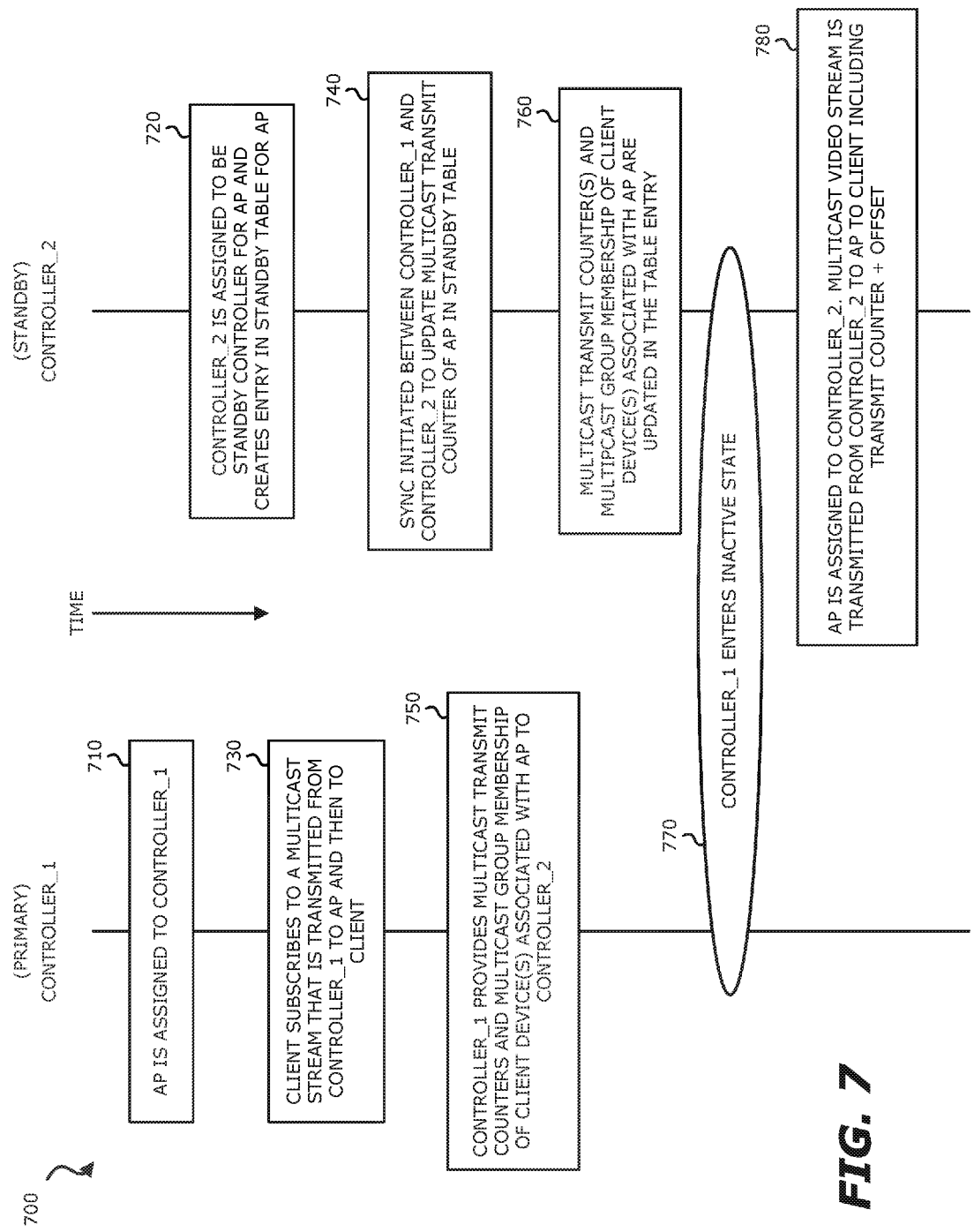
FIG. 7 is a block diagram illustrating a timeline 700 of actions involving a primary controller and a standby controller regarding the handling multicast subscriptions of an access point.

Referring to FIG. 7, a block diagram illustrating a timeline 700 of actions involving a primary controller and a standby controller regarding the handling of multicast subscriptions of an access point is shown. The left column illustrates actions involving the primary controller and the right column illustrates actions involving the standby controller. In the embodiment illustrated in FIG. 7, the actions are shown to progress in a time-ordered, top-to-bottom manner. However, in other embodiments, the order of one or more actions may differ. At block 710, an AP enters an active state within the control scope of the cluster of controllers and controller_1 is assigned as the primary controller of the AP.

At block 720, controller_2 is assigned to be the standby controller of the AP. Controller_2 subsequently creates an entry in its standby AP database for the AP. At block 730, a client device associated with the AP subscribes to a multicast stream that is transmitted from controller_1 to the AP to the client device.

At block 740, a synchronization is initiated between controller_1 and controller_2. As stated above, the initiation of a synchronization between controller_1 and controller_2 may be a result of either a push method of controller_1 or a pull method of controller_2. In one embodiment in which a push method of controller_1 is used, controller_1 may push current state information of the AP to controller_2 such that controller_2 may update the entry in its standby table corresponding to the AP. The push of current state information by controller_1 may occur at predefined time intervals and/or after a predetermined number of packets have been transmitted by controller_1. For example, as above, a push of current state information may occur every 30 seconds and also occur after transmission of 1,500 packets by controller_1 to the client device (or vice versa). A pull of current state information (e.g., transmission of a request for one or more packets containing the current state information of the client device) may occur at predefined time intervals.

At block 750, controller_1 provides controller_2 with one or more portions of the current state information. In one embodiment, the one or more portions of the current state information include, but are not limited or restricted to, at least the current multicast subscription information corresponding to the client devices associated with the AP and the current multicast transmit counter for each multicast stream to which at least one client associate with the AP is subscribed. Additionally, in one example, a client device may subscribe to a multicast stream to which no other client device associated with the AP has subscribed. In such an example, if the multicast stream requires encryption, the encryption key will be synchronized as well. As discussed above, a retry mechanism may be implemented while synchronizing state information of the AP.

At block 760, when controller_2 receives the one or more portions of the current state information corresponding to the client devices associated with the AP from controller_1, controller_2 updates the entry in the multicast standby state information database corresponding to the AP.

At block 770, controller_1 enters an inactive state. At block 780, the AP is assigned to controller_2. The transition of controller_1 handling the multicast subscriptions of the AP to controller_2 handling the multicast subscriptions of the AP occurs while maintaining the multicast subscription without a need to poll each client device associated with the AP to determine the multicast streams to which each client device is subscribed.

Previously, when a controller entered an inactive state while handling the multicast subscriptions of one or more client devices associated with an AP, the standby controller that assumed responsibility for handling the multicast subscriptions of the AP was required to poll each of the client devices associated with the AP to determine the multicast subscriptions transmitted via the AP. Herein, by storing the multicast subscriptions of the AP at the standby controller (e.g., controller_2), the standby controller can handle the transmission of the multicast stream(s) of the one or more client devices associated with the AP without polling each client device. By storing the multicast subscriptions of the AP, the standby controller can continue the transmission of the one or more multicast stream to the AP so that the one or more multicast streams may be transmitted by the AP to the one or more associated client devices.

Still referring to block 780, controller_2 transmits one or more packets of each multicast stream that include the transmit counter corresponding to the multicast stream stored in an entry for the AP in the multicast standby state information table of controller_2 plus an offset. The transmit counter for each multicast stream stored in the multicast standby state information table of controller_2 is incremented by the offset in order to account for one or more packets that may be been transmitted by controller_1 to the client device following the last synchronization of state information between controller_1 and controller_2. As discussed below, the offset may be the same for each multicast stream or one or more offsets may differ. Accounting for the possibility that controller_1 transmitted one or more packets of a multicast stream to the client device following the last synchronization with controller_2 is critical in ensuring a seamless transition of controller_2 handling the network traffic of the client device. As discussed above, the client device maintains a receive counter for each multicast stream which corresponds to the last transmit counter received in a transmission of the multicast from the primary controller (e.g., controller_1). The client device will reject any packets of a multicast stream that are received that include a transmit counter having a lower value than the receive counter stored by the client device for that multicast stream. The client device behaves this way to aid in protecting against security attacks, in particular replay attacks.

The offset may be a predefined numerical value or may be dynamically computed by the logic of controller_2. For example, in one embodiment, a predefined offset may correspond to a predetermined threshold (number of packets) that, when met and/or exceeded, triggers a synchronization of state information between the primary controller and the standby controller of the client device (e.g., the offset may be twice the value of the predetermined threshold that triggers the synchronization of state information).

Figure 8:
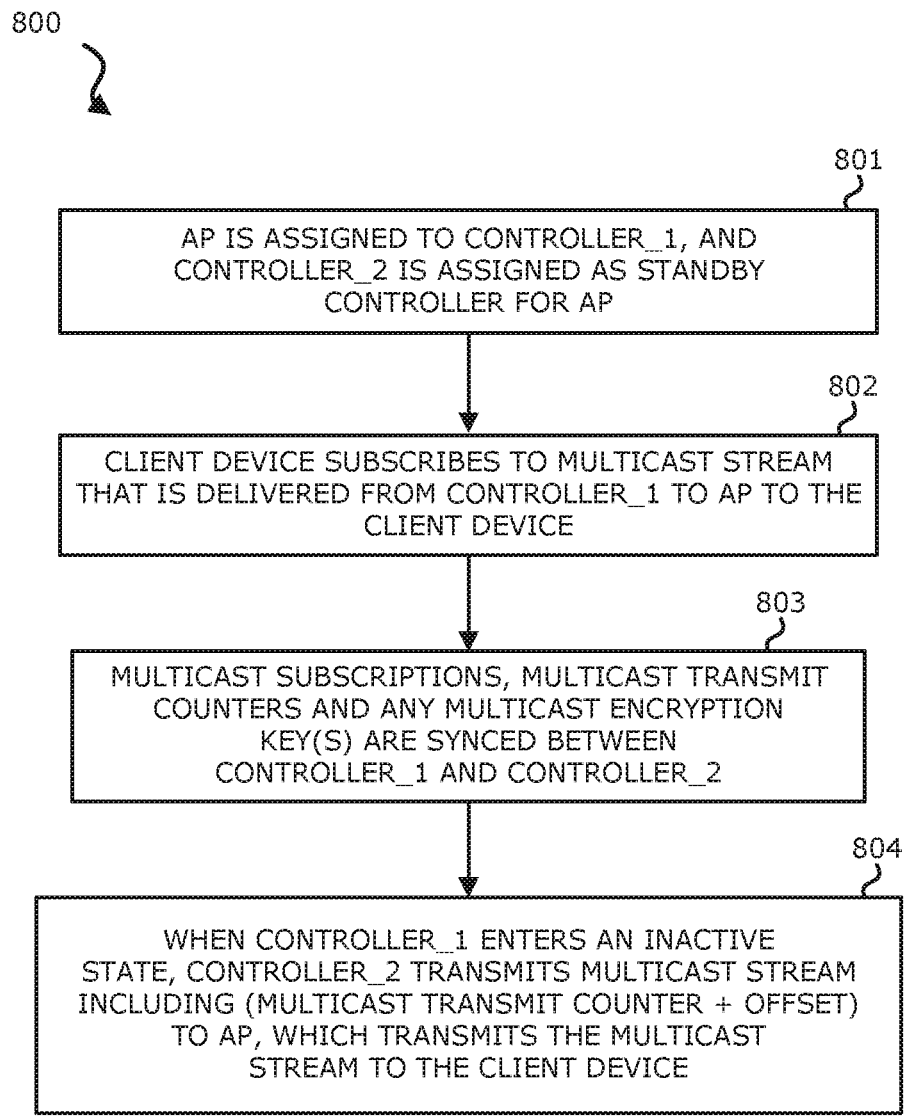
FIG. 8 is a flowchart of an example process of actions involving a primary controller and a standby controller regarding the handling of multicast stream transmissions of an access point.

Referring to FIG. 8, a flowchart of an example process of actions involving a primary controller and a standby controller regarding the handling of multicast stream transmissions of an access point is shown. Each block illustrated in FIG. 8 represents an operation performed in the method 800 of synchronizing one or more portions of state information of an AP, particularly a transmit counter for each multicast stream to which at least one client device associated with the AP has subscribed, between a primary controller for the AP and a standby controller for the AP. Additionally, the encryption information for each multicast stream, if applicable, may be synchronized. At block 801, an AP enters an active state on a network within the control scope of a cluster of controllers. The AP is assigned to controller_1 (e.g., the primary controller) and controller_2 is assigned as the standby controller for the AP. Herein, both controller_1 and controller_1 are included within the cluster of controllers. As a result, controller_2 creates an entry for the AP in the multicast standby state information table of controller_2. If the multicast stream includes encryption information (e.g., controller_1 encrypts the multicast stream and only those client devices having the proper key may decrypt the multicast stream), the encryption information is stored in the multicast standby state information table.

In one embodiment, employees of a particular department of a corporation may subscribe to a multicast stream that contains sensitive and/or confidential information. The multicast stream may be encrypted such that only employees working within the particular department may have access to the encryption key necessary to decrypt the multicast stream.

At block 802, a client device associated with the AP subscribes to a multicast stream that is delivered to the client device from controller_1 through the AP. At block 803, a synchronization of the state information of the AP is initiated between controller_1 and controller_2. In one embodiment, the multicast subscriptions, the multicast transmit counter for each of the multicast subscriptions and any multicast encryption keys, if applicable, are synchronized from controller_1 to controller_2. As discussed above, a synchronization may be initiated by a push method of controller_1 and/or a pull method of controller_2. Furthermore, as discussed above, the synchronization may be initiated according to a predetermined time interval and/or a predetermined threshold number of packets of one or more multicast streams transmitted from controller_1 to the AP.

At block 804, when controller_1 enters an inactive state, controller_2 assumes responsibility of handling the multicast stream transmissions to the AP. When controller_2 assumes responsibility of handling the multicast stream transmissions, controller_2 sends one or more packets for each multicast subscription and includes the synchronized multicast transmit counter corresponding to each multicast stream incremented by an offset. As discussed above, the offset may be a predefined value or may be calculated dynamically by controller_2 according to the packet transmission rate of each multicast stream. In one embodiment, the value of the offset may be the same for each multicast stream and in a second embodiment, the value of the offset may be different for one or more of the multicast streams. Additionally, if a multicast stream includes an encryption key, controller_2 will encrypt the multicast stream according to the synchronized encryption key.

V. Client Session Continuity

When the primary controller of a client device enters an inactive state and the standby controller assumes responsibility for handling the network traffic of the client device, the standby controller should be aware of particular sessions is use by the client device. Even if the encryption information for the client device is maintained by the standby controller such that the client device is not required to undergo a deauthentication process and a re-authentication process, the client device may time-out if all of its sessions are lost when the primary controller enters an inactive state. Examples of sessions that may be opened and in use by a client device include, but are not limited or restricted to, HTTP sessions, FTP sessions, Real-time Transport Protocol (RTP) sessions, Simple Mail Transfer Protocol (SMTP) sessions, Domain Name system (DNS) sessions, Transmission Control Protocol/Internet Protocol (TCP/IP) sessions or the like. Herein, a session may be defined using a 5-tuple value comprising: {source IP address; destination IP address; source port number; destination port number; protocol used}.

Sessions not saved by the standby controller for a client device will be lost when the primary controller enters an inactive state (or the controller to which the client device is assigned changes due to load-balancing efforts). For example, if a Voice Over IP (VoIP) call is initiated by a user of a client device, the client device may open a RTP session. If the standby controller for the client device does not store the RTP session, the VoIP call will be lost when the primary controller enters an inactive state (or the controller to which the client device is assigned changes due to load-balancing efforts).

A client device may open hundreds or even thousands of sessions in a short period of time and many of these sessions may be short-lived. For example, when a user requests a web page using an Internet browsing application, multiple HTTP sessions may be opened to receive data appearing on the web page (e.g., a HTTP session may be opened for every advertisement, banner, heading, etc. loaded on the requested web page). Based on the large number of sessions opened by client devices, the short amount of time for which many of the sessions are opened, and the nature of many of the sessions, synchronizing every session at the standby controller would waste a large portion of a network's bandwidth.

Alternatively, a direct wired connection provided between the primary controller and the standby controller may avoid wasting the network's bandwidth. However, within a cluster of controllers, the primary controller and standby controllers may change frequently for one or more client devices; therefore, each controller would have to be communicatively coupled through wiring which may limit the configuration of the controllers and the wireless communication network.

Therefore, the standby controller may maintain session continuity by synchronizing only those sessions opened by a client device that are both (1) "stable" and (2) "high value." In one embodiment, a session may be defined as stable when (i) processing on the session has completed, if applicable, (e.g., deep-packet inspection (DPI) has been completed) and (ii) the session persists after the completion of processing for at least a predetermined period of time. A session may be defined as high value when the session information for the session is not identified an access control list (ACL) and the session information for the session is, instead, determined by analyzing data packets of the session dynamically. For example, the session information of a FTP session is not known until a 'PORT' command is exchanged through the control session which identifies the port that will be used to transmit the FTP data. In one embodiment, as a result of DPI, a session may be classified as "allow" or "deny," In an embodiment in which the session is classified as "allow," one or more type of service (TOS) values may be added and/or changed during the DPI process, and hence, be classified as, for example, "TOS modified." In such embodiments, the session may be classified as high value as well.

An identical ACL is stored on each controller, meaning the same set of filtering criteria included in the ACL is applied at each controller. Therefore, sessions identified by the ACL do not need to be synchronized as the identifying information will be present on the standby controller and the sessions present on the ACL will be created upon the primary controller of the client device entering an inactive state. As a contrasting example, DPI classification requires an analysis of one or more packets transmitted during a session's lifespan. When this classification is not synchronized between the primary controller and the standby controller, the classified session will not automatically be created upon the primary controller entering an inactive state but instead, one or more packets transmitted during the session's lifespan will need to undergo DPI at the standby controller in order for the standby controller to take action on the session (e.g., allow, deny, restrict bandwidth, perform NAT, etc.).

Referring to FIG. 9, a diagram illustrating an example of entries of a main client session table 900 is shown. The main client session table 900 is maintained by the primary controller of the client devices corresponding to the index values present in column 901. As seen in FIG. 9, the primary controller maintaining the main client session table 900 acts as the primary controller for, at least, a first client device corresponding to the index value '1', a second client device corresponding to the index value '2' and a third client device corresponding to the index value '3'. Additionally, FIG. 9 illustrates that multiple sessions for a single client device may be stored in the main client session table 900 (e.g., the main client session table 900 includes pointers to three sessions for the client device corresponding to the index value '1'). The main client session table 900 may be stored in a non-transitory computer-readable storage medium in the primary controller.

The column 901 represents an index value that uniquely identifies the client device to which the information of the corresponding row belongs. In one embodiment, the index value may be computed from a hash value computed from the MAC address of the client device. Referring to row 910 for explanatory purposes, the column 902 represents a pointer value representing the address in memory where the 5-tuple value information for a session of the client device corresponding to the index value '1' is stored.

The column 903 represents an action that is to be performed with respect to the corresponding session. Examples of actions that may be performed include, but are not limited or restricted to, allowing the session access to the communication network, deny the session access to the communication network, redirecting the session (e.g., to a tunnel), limiting the bandwidth of the session to, at most, a predefined amount, the process of network address translation (NAT), or the like. Additionally, actions may be set forth in the ACL for certain types of sessions. Of course, the main client session table 900 is not limited to seven index entries but may, in one embodiment, include hundreds of entries, and in a second embodiment, include thousands of entries. The actions to be performed may be applicable to numerous session types and are not limited to DPI session or FTP sessions.

The column 904 represents the result of the determination made by the primary controller as to whether the corresponding session is "stable." In FIG. 9, a determination that the session is stable is represented by a check mark and a determination that the session is not stable is represented by 'X'. The column 905 represents the result of the determination made by the primary controller as to whether the corresponding session is "high value." In FIG. 9, a determination that the session is high value is represented by a check mark and a determination that the session is not high value is represented by 'X'.

Referring to FIG. 10, a diagram illustrating an example of entries of a standby client session table 1000 is shown. The standby client session table 1000 is maintained by the standby controller for client devices corresponding to the index values present in column 1001. As seen in FIG. 10, the standby controller maintaining the standby client session table 1000 is assigned to be the standby controller for, at least, a first client device corresponding to the index value '1' and a second client device corresponding to the index value '5'. In one embodiment, the primary controller for the client device corresponding to the index value '1' is different than the primary controller for the client device corresponding to the index value '5'. In a second embodiment, the primary controller for the client devices corresponding to the index value '1' is the same as the primary controller of the client device corresponding to the index value '5'. The standby client session table 1000 may be stored in a non-transitory computer-readable storage medium in the standby controller.

The standby client session table 1000 includes the column 1001, which represents an index value that uniquely identifies the client device to which the information of the corresponding row belongs. Referring to row 1010 for explanatory purposes, the column 1002 represents the primary controller of the client device corresponding to the index value '1'. The column 1003 represents the 5-tuple values comprising a session of the client device corresponding to the index value '1'. As shown in FIG. 10, the 5-tuple values may correspond to an FTP session and may be, for example, {source IP address; destination IP address; source port number; destination port number; protocol} being {10.20.22.92; 77.30.100.32; 10001; 20; 1}, The column 1004 represents an action that is to be performed with respect to the corresponding session, as discussed above in relation to FIG. 9.

Figure 11:
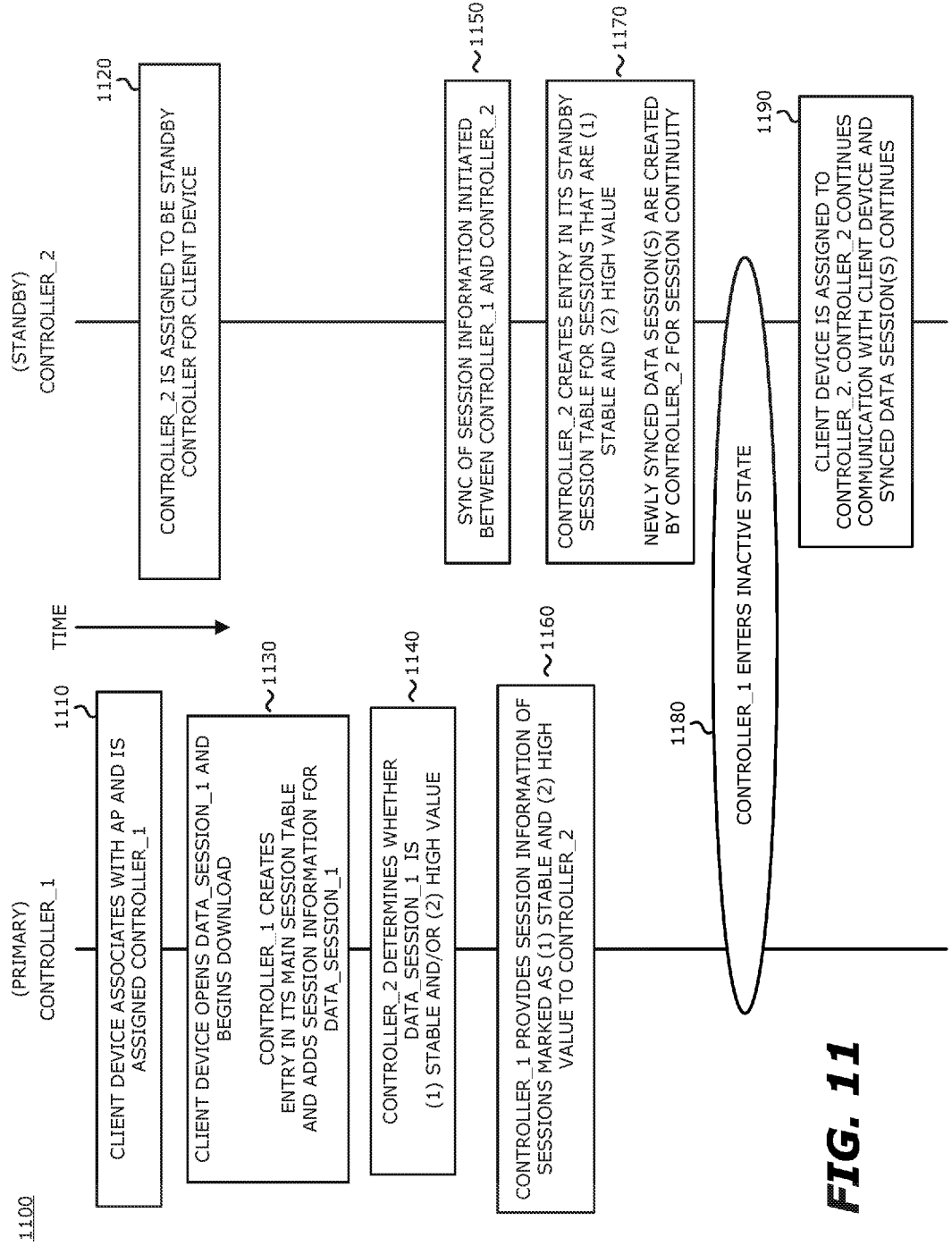
FIG. 11 is a block diagram illustrating a timeline 1100 of actions involving a primary controller and a standby controller pertaining to the handling of a client device.

Referring to FIG. 11, a block diagram illustrating a timeline 1100 of actions involving a primary controller and a standby controller pertaining to the handling of a client device is shown. The left column illustrates actions involving the primary controller and the right column illustrates actions involving the standby controller. In the embodiment illustrated in FIG. 11, the actions are shown to progress in a time-ordered, top-to-bottom manner. However, in other embodiments, the order of one or more ions may differ. At block 1110, controller_1, included within a cluster of controllers, is assigned to be the primary controller for a client device that associates with an AP within the control scope of the cluster of controllers. At block 1120, controller_2 is assigned to be the standby controller for the client device.

At block 1130, the client device opens data_session_1 and begins a download. In response, controller_1 creates an entry in its main client session database for data_session_1 and adds the session information to the entry for data_session_1. As illustrated in FIG. 9, the session information may include a pointer to the session (e.g., the 5-tuple value) in the memory of controller_1, one or more actions that are to be performed with respect to the session, whether the session is "stable" and/or whether the session is "high value." For example, the user of the client device may open a video chat application (e.g., FaceTime or Skype), hence opening up a RTP session. Subsequently, controller_1 creates an entry in its main session table for the RTP session and adds the session information for the RTP session in that entry. At block 1140, controller_2 determines whether data_session_1 is (1) stable and/or (2) high value, as discussed above.

At block 1150, a synchronization of the session information for the one or more stable and high value sessions of the client device is initiated between controller_1 and controller_2. The initiation of a synchronization between controller_1 and controller_2 may be a result of a push method of controller_1 and/or a pull method of controller_2. In one embodiment in which a push method of controller_1 is used, controller_1 may push current session information for the one or more sessions of the client device to controller_2 such that controller_2 may update the entries in its standby client session table corresponding to the one or more sessions of the client device, add one or more entries and/or remove one or more entries. The push of current session information (e.g., 5-tuple values for each session and any action to be performed with respect to a particular session, if applicable) by controller_1 may occur at predefined time intervals (e.g., every 30 seconds) and/or after a predetermined number of packets have been transmitted by controller_1. For example, a push of current session information may occur every 30 seconds and also occur after transmission of 1,500 packets by controller_1 to the client device. A pull of current session information (e.g., transmission of a request for one or more packets containing the current session information of the one or more sessions of the client device) may occur at predefined time intervals. In one embodiment, both methods may be used.

At block 1160, controller_1 provides controller_2 with the current session information of the one or more sessions of the client device that have been marked by controller_1 as (1) stable and (2) high value. For example, as data_session_1 has been marked as (1) stable and (2) high value by controller_1, controller_1 will provide the session information for data_session_1 to controller_2 as a result of the initiation of the synchronization process.

At block 1170, when controller_2 receives the current session information from controller_1, controller_2 creates an entry in the standby client session table corresponding to each of the one or more sessions the client device that have been determined to be both (1) stable and (2) high value. In one embodiment, controller_2 may remove one or more entries in the standby client session able when session information for a session is no longer provided by controller_1 (e.g., as a result of the session ending, the session no longer being marked as stable by controller_1 and/or the session no longer being marked as high value by controller_1). Still referring to block 1170, controller_2 also creates a session for each new entry in its standby client session table to ensure session continuity if controller_1 enters an inactive state. As discussed above, a retry mechanism may be implemented when synchronizing session information.

At block 1180, controller_1 enters an inactive state. At block 1190, the client device is assigned to controller_2. When the transition from controller_1 handling the network traffic of the client device to controller_2 handling the network traffic of the client device occurs, the one or more sessions of the client device remain operational. Controller_2 had already created sessions for those stored in its standby client session table. Therefore, there is no need to require the client device reopen all sessions that were open prior to controller_1 entering an inactive state. However, as discussed above, the client device will be required to reopen those sessions that controller_1 did not determine to be both (1) stable and (2) high value as only session information of the one or more sessions meeting that criteria were synchronized.

Figure 12:
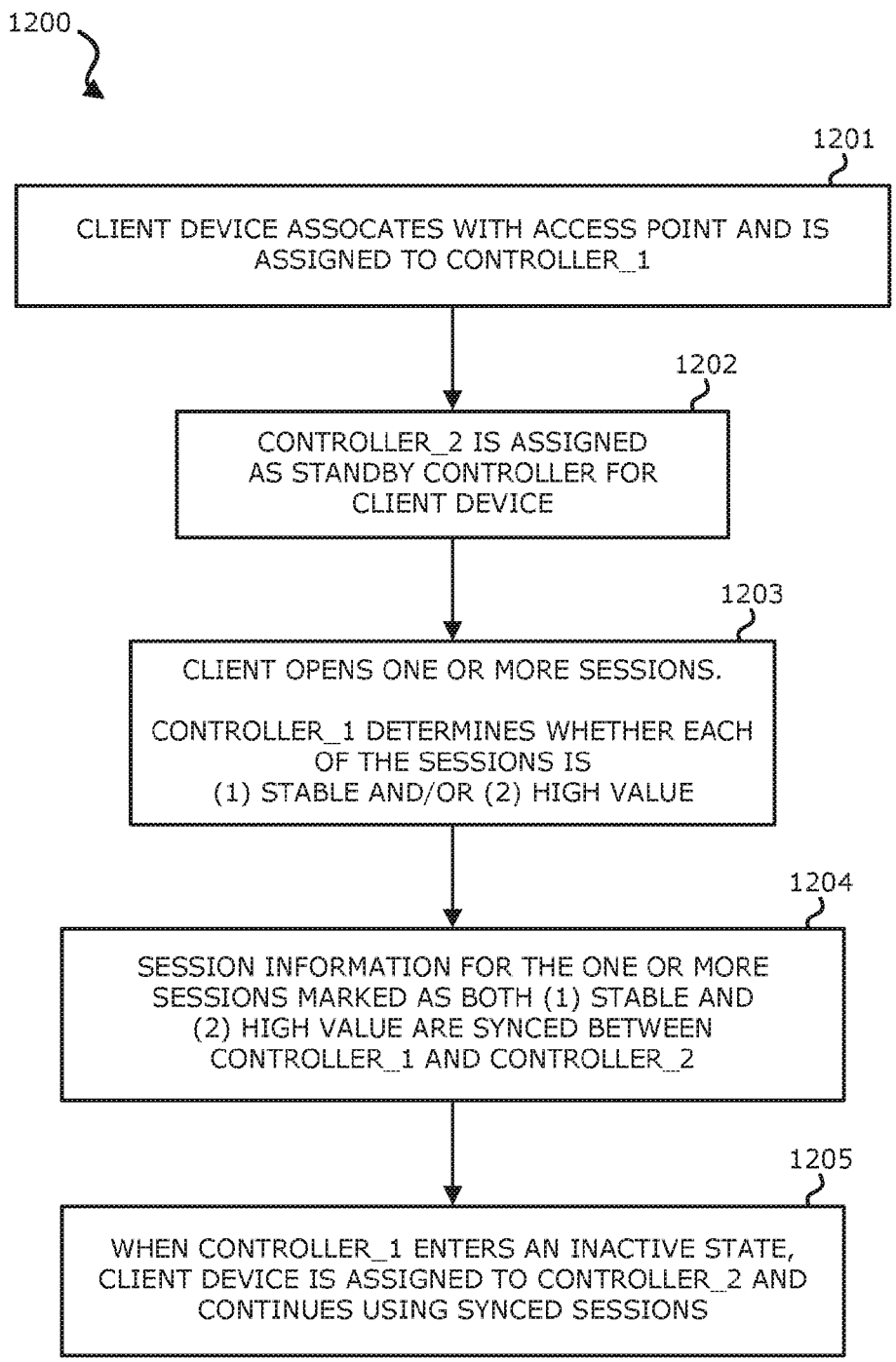
FIG. 12 is a flowchart of an example process of actions involving a primary controller and a standby controller regarding the synchronization of session information of a client device.

Referring to FIG. 12, a flowchart of an example process of actions involving a primary controller and a standby controller regarding the synchronizing of session information of a client device is shown. Each block illustrated in FIG. 12 represents an operation performed in the method 1200 of synchronizing one or more portions of session information of sessions determined to be (1) stable and (2) high value. At block 1201, a client device associates with an AP within the control scope of a cluster of controllers, the client device is assigned to controller_1 (the primary controller) being within the cluster of controllers and the client device obtains network connectivity through controller_1. At block 1202, controller_2 is assigned to be the standby controller for the client device.

At block 1203, the client device opens one or more sessions (e.g., opens a web page in an Internet browsing application, initiates an audio call, initiates streaming of audio from a music streaming application, etc.). Controller_1 determines whether each of the one or more sessions opened by the client device is (1) stable and/or (2) high value. When a determination is made as to whether a session is stable and/or high value, controller_1 includes the determination result in the main client session table, as is illustrated in FIG. 9.

At block 1204, the session information for the one or more sessions that were determined to be both (1) stable and (2) high value are synchronized between controller_1 and controller_2. In particular, upon initiation of a synchronization between controller_1 and controller_2, controller_1 will provide controller_2 with the 5-tuple values of each of the sessions of the client device that have been marked both (1) stable and (2) high value. Optionally, as discussed above, the session information synchronized between controller_1 and controller_2 may include actions to perform with respect to the sessions corresponding to the session synchronized from controller_1 to the client device.

At block 1205, when controller_1 enters an inactive state, controller_2 assumes responsibility for handling the network traffic of the client device. As the session information has been synchronized, the sessions of the client device that were determined to be both (1) stable and (2) high value are not lost. The client device may continue using the synchronized sessions even through the controller handling the network traffic of the client device has changed.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

We claim:

1. A non-transitory computer readable medium comprising instructions which, when executed by one or more hardware processors, causes performance of operations comprising:
   analyzing, by a first network coordination device, at least one session of the client device for selected characteristics, the first network coordination device being the primary network coordination device for the client device; and
   providing, by the first network coordination device, current session information of the at least one session of the client device having the selected characteristics to the second network coordination device, the second network coordination device being the standby network coordination device for the client device,
   wherein the selected characteristics include whether a session is determined to be open for more than a predetermined amount of time after processing of the session is complete, and
   wherein the selected characteristics include whether (1) a session is not described in an access control list and (2) at least one of (i) the session is a file transport protocol (FTP) session or (ii) the session is classified by deep-packet inspection (DPI).

2. The non-transitory computer readable medium of claim 1, wherein the session is classified by DPI as one of (a) allow or (b) deny.

3. The non-transitory computer readable medium of claim 1 comprising:
   monitoring, by the first network coordination device, the at least one session opened by the client device having the selected characteristics; and
   storing, in a storage device of the first network coordination device, the session information of each of the at least one session opened by the client device having the selected characteristics.

4. The non-transitory computer readable medium of claim 1, wherein the first network coordination device provides the session information of the at least one session of the client device having the selected characteristics at predefined time intervals.

5. The non-transitory computer readable medium of claim 1, wherein, in response to receiving a request from the second network coordination device, the first network coordination device providing the session information of the at least one session of the client device having the selected characteristics to the second network coordination device.

6. The non-transitory computer readable medium of claim 1 further comprising:
   responsive to not receiving an acknowledgement from the second network coordination device within a predetermined time period, providing, by the first network coordination device, a second iteration of the session information of the at least one session of the client device having the selected characteristics.

7. A system comprising:
   a plurality of network coordination devices each (i) comprising a hardware processor and (ii) associated with a wireless network;

the system being configured to perform operations comprising:

analyzing, by a first network coordination device, at least one session of the client device for selected characteristics, the first network coordination device being the primary network coordination device for the client device; and providing, by the first network coordination device, current session information of the at least one session of the client device having the selected characteristics to the second network coordination device, the second network coordination device being the standby network coordination device for the client device, wherein the selected characteristics include whether a session is determined to be open for more than a predetermined amount of time after processing of the session is complete, and wherein the selected characteristics include whether (1) a session is not described in an access control list and (2) at least one of (i) the session is a file transport protocol (FTP) session or (ii) the session is classified by deep-packet inspection (DPI).

8. The system of claim 7, wherein the session is classified by DPI as one of (a) allow or (b) deny.

9. The system of claim 7 being configured to perform further operations comprising:

monitoring, by the first network coordination device, the at least one session opened by the client device having the selected characteristics; and storing, in a storage device of the first network coordination device, the session information of each of the at least one session opened by the client device having the selected characteristics.

10. The system of claim 7, wherein the first network coordination device provides the session information of the at least one session of the client device having the selected characteristics at predefined time intervals.

11. The system of claim 7, wherein, in response to receiving a request from the second network coordination device, the first network coordination device providing the session information of the at least one session of the client device having the selected characteristics to the second network coordination device.

12. The system of claim 7 being configured to perform further operations comprising:

responsive to not receiving an acknowledgement from the second network coordination device within a predetermined time period, providing, by the first network coordination device, a second iteration of the session information of the at least one session of the client device having the selected characteristics.

13. A non-transitory computer readable medium comprising instructions which, when executed by one or more hardware processors, causes performance of operations comprising:

receiving, by a second network coordination device being a standby network coordination device for a client device, current session information of at least one session of the client device from a first network coordination device being a primary network coordination device for the client device, wherein the at least one session of the client device has selected characteristics; and responsive to detecting a particular event, the second network coordination device transitioning to be the primary network coordination device of the client device wherein the at least one session of the client device having the selected characteristics remains open and in use by the client device, wherein the selected characteristics include whether a session is determined to be open for ore than a predetermined amount of time after processing of the session is complete, and wherein the selected characteristics include whether (1) a session is not described in an access control list and (2) at least one of (i) the session is a file transport protocol (FTP) session or (ii) the session is classified by deep-packet inspection (DPI).

14. The non-transitory computer readable medium of claim 13, wherein the session is classified by DPI as one of (a) allow or (b) deny.

15. The non-transitory computer readable medium of claim 13, further comprising:

storing, in a storage device of the second network coordination device, the session information of the at least one session of the client device having the selected characteristics; and opening, by the second network coordination device, a session corresponding to each of the at least one session of the client device having the selected characteristics.

16. The non-transitory computer readable medium of claim 13, wherein the particular event is one of (i) a load-balancing instruction, or (ii) the first network coordination device entering an inactive state.

17. The non-transitory computer readable medium of claim 13 further comprising:

responsive to not receiving the current session information for the least one session of the client device having the selected characteristics within a predetermined period of time, the second network coordination device transmitting, to the first network coordination device, a second iteration of a request for the session information of the at least one session of the client device having the selected characteristics.

\* \* \* \* \*